(12) United States Patent
Krozer

(10) Patent No.: US 8,854,258 B2
(45) Date of Patent: Oct. 7, 2014

(54) METHOD AND DEVICE FOR SYNTHETIC IMAGING

(75) Inventor: Viktor Krozer, Berlin-Charlottenburg (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 522 days.

(21) Appl. No.: 12/678,872

(22) PCT Filed: Sep. 5, 2008

(86) PCT No.: PCT/EP2008/061805
§ 371 (c)(1),
(2), (4) Date: Aug. 16, 2010

(87) PCT Pub. No.: WO2009/040233
PCT Pub. Date: Apr. 2, 2009

(65) Prior Publication Data
US 2010/0295725 A1 Nov. 25, 2010

(30) Foreign Application Priority Data
Sep. 20, 2007 (DE) .......................... 10 2007 045 103

(51) Int. Cl.
*G01S 13/00* (2006.01)
*G01S 13/90* (2006.01)
*G01S 13/88* (2006.01)

(52) U.S. Cl.
CPC ............... *G01S 13/003* (2013.01); *G01S 13/90* (2013.01); *G01S 13/887* (2013.01)
USPC ........................... 342/193; 342/25 R; 342/192

(58) Field of Classification Search
USPC .......................................... 342/25, 192–193
See application file for complete search history.

(56) References Cited

U.S. PATENT DOCUMENTS

| | | | |
|---|---|---|---|
| 3,909,827 A | 9/1975 | Tricoles et al. | |
| 4,068,234 A | 1/1978 | O'Meara | |
| 6,597,304 B2* | 7/2003 | Fienup | 342/25 R |
| 6,885,191 B1 | 4/2005 | Gleman | |
| 7,365,672 B2 | 4/2008 | Keller et al. | |
| 2002/0165001 A1* | 11/2002 | Phillips et al. | 455/500 |
| 2006/0214107 A1* | 9/2006 | Mueller | 250/341.8 |
| 2007/0228280 A1* | 10/2007 | Mueller | 250/341.1 |

FOREIGN PATENT DOCUMENTS

| | | |
|---|---|---|
| DE | 102005016106 A1 | 10/2006 |
| EP | 1227341 A2 | 7/2002 |
| WO | 2007/041024 A1 | 4/2007 |
| WO | 2007/084152 A2 | 7/2007 |

* cited by examiner

*Primary Examiner* — Timothy A Brainard
(74) *Attorney, Agent, or Firm* — Fitzpatrick, Cella, Harper & Scinto

(57) ABSTRACT

A method of synthetic imaging comprising the steps of: emitting a first electromagnetic signal having a first frequency from a first radiation source, emitting at least one second electromagnetic signal having a second frequency from a second radiation source, wherein the first and second frequencies are different from each other, substantially simultaneously receiving the first signal and the second signal with a first receiver, substantially simultaneously receiving the first signal and the second signal with at least one second receiver, arranging an object on the path of at least one electromagnetic signal between the radiation sources and the receivers, wherein the signals are reflected by the object before they meet the receivers, and computing an image of the object from the signals received by the receivers and a device for practicing the method.

17 Claims, 1 Drawing Sheet

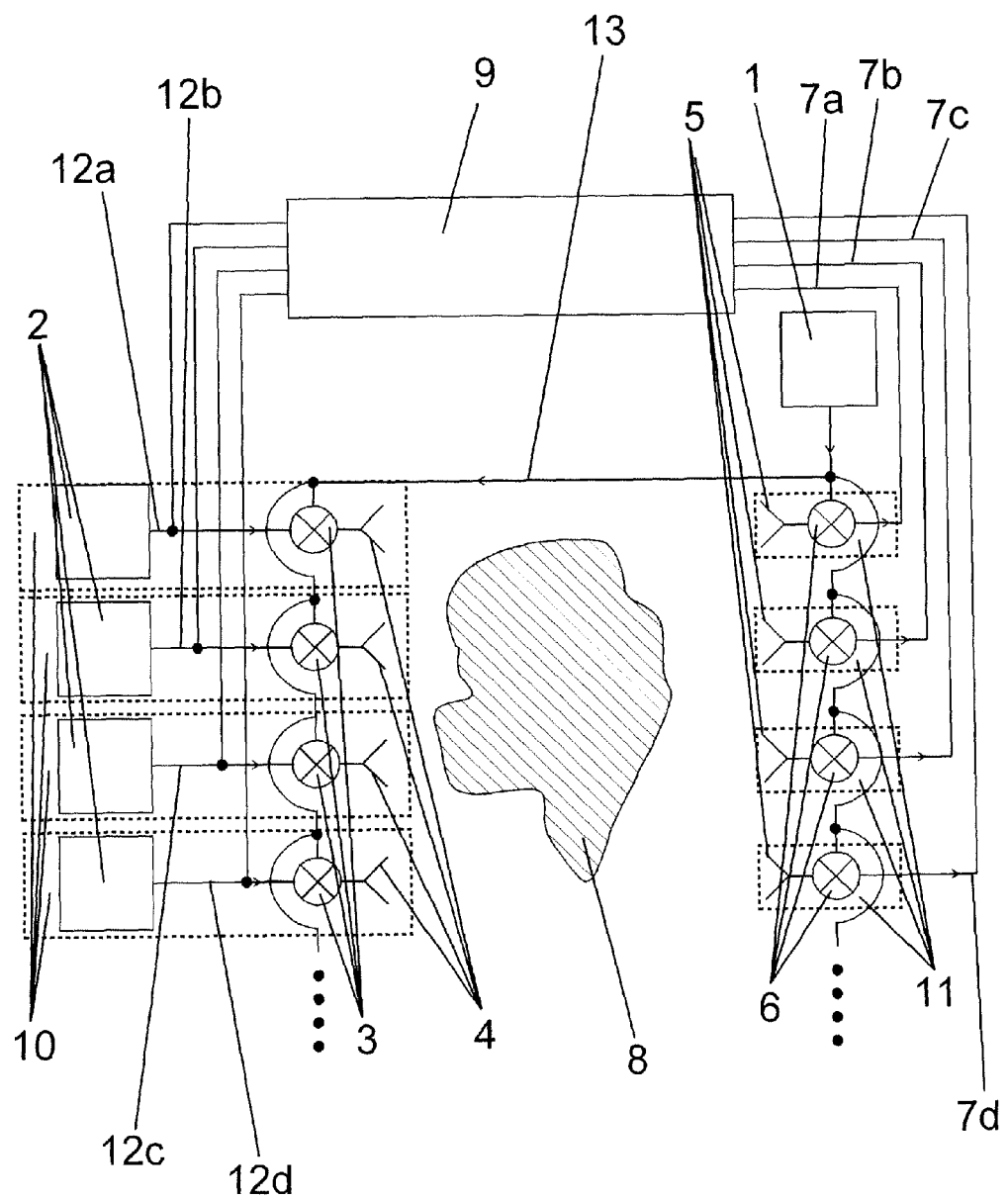

METHOD AND DEVICE FOR SYNTHETIC IMAGING

CROSS REFERENCE TO RELATED APPLICATIONS

This claims priority from German Patent Application DE 102007045103.4 filed Sep. 20, 2007.

BACKGROUND OF THE INVENTION

The present invention concerns a method and an apparatus for synthetic imaging.

The principle of synthetic imaging which is frequently also referred to as imaging with a synthetic aperture involves replacing the snapshot of an antenna or an objective with a large aperture by a multiplicity of chronologically successive recordings of a moved antenna or a moved objective with a small aperture or also with a multiplicity of chronologically successive recordings of a multiplicity of stationary antennas or stationary objectives with a small aperture.

The best-known system for synthetic imaging is the so-called synthetic aperture radar (in brief: SAR). In that case the transmitting and receiving antenna of a radar system which is mounted for example on aircraft are moved past an object. In the course of that movement the object is irradiated and suitably recorded, at variable viewing angles. If the path of the transmitting and receiving antennas is sufficiently known, the aperture of a large antenna can be synthesised from the intensity and the phase position of the high frequency signal emitted by the transmitting antenna and reflected back by the object to the receiving antenna, and thus a high level of positional resolution can be achieved in the direction of movement of the antenna. A specific synthetic antenna is calculated by means of the recorded data of the reflected radar signal, for each position irradiated by the transmitting antenna in the course of the flight therepast, the angular resolution of the synthetic antenna calculated at the azimuth being so selected that the geometrical resolution is the same in the direction of flight or movement, for all distances considered.

For stationary applications, for example for monitoring people by means of high frequency radiation in the megahertz and gigahertz frequency range, systems are known which, instead of a single pair of transmitting and receiving antennas which are in motion relative to the object, use a plurality of transmitting and receiving antennas which image the object at different angles and the signals of which are evaluated in accordance with the SAR principle. In that respect, either the transmitting antennas themselves or separate receiving antennas can be used for receiving the waves reflected from or transmitted by an object. To achieve spatial resolution which is as good as possible the signal emitted by a single transmitting antenna is received with a plurality of receiving antennas.

For that purpose the state of the art, for example DE 10 2005 016 106 A1, WO 2007/041024 or U.S. Pat. No. 3,909,827 discloses systems for and methods of imaging with a synthetic aperture, which distinguish from each other the signals emitted by the individual transmitting antennas after their reflection by an object or their transmission through an object, upon reception on a plurality of receivers. In that case the individual transmitting antennas emit their signals which are all at the same frequency in chronological sequence, that is to say signal emission from the individual transmitters takes place serially. In that method the signal received at each receiver can be uniquely associated with a transmitter at any time, but serial activation of the transmitters involves a comparatively long measurement time.

BRIEF DESCRIPTION OF THE SEVERAL VIEWS OF THE DRAWINGS

FIG. 1 shows the diagrammatic structure of an apparatus according to the invention for producing a synthetic image of an object.

BRIEF SUMMARY OF THE INVENTION

In comparison the object of the present invention is to provide a method and a system for synthetic imaging, in which the measurement time is markedly reduced in relation to the state of the art.

That object is attained according to the invention by a method of synthetic imaging which involves the following steps: emitting a first electromagnetic signal having a first frequency from a first radiation source, emitting at least one second electromagnetic signal having a second frequency from a second radiation source, wherein the first and second frequencies are different from each other, and substantially simultaneously receiving the first signal and the second signal with a first receiver and substantially simultaneously receiving the first signal and the second signal with at least one second receiver.

More particularly the invention is a method of synthetic imaging including the steps of:

emitting a first electromagnetic signal having a first frequency from a first radiation source, emitting at least one second electromagnetic signal having a second frequency from a second radiation source, wherein the first and second frequencies are different from each other substantially simultaneously receiving the first signal and the second signal with a first receiver, substantially simultaneously receiving the first signal and the second signal with at least one second receiver, arranging an object on the path of at least one electromagnetic signal between the radiation sources and the receivers, wherein the signals are reflected by the object before they meet the receivers, and computing an image of the object from the signals received by the receivers.

DETAILED DESCRIPTION OF THE INVENTION

The method according to the invention encodes the electromagnetic signals emitted by the individual transmitters by means of the frequency of the emitted signals. As in an embodiment there are no two radiation sources with an identical frequency in respect of the respectively emitted electromagnetic signal, each signal received by a receiver can be uniquely associated with a single radiation source.

As each of the receivers simultaneously receives the first signal and the second signal, a large aperture can be synthesised from the received signals in a short time, and a high-resolution image can be calculated.

In accordance with the present invention the expression frequency of the electromagnetic signals is used to denote the carrier frequency thereof and not for example the modulation frequency thereof.

In that respect the method according to the invention is not limited to the emission and reception of two signals, but in an embodiment of the invention more than two signals are emitted and received. In that case preferably all emitted signals are of frequencies which are different from each other.

In an embodiment the first and second receivers are coupled together in locked-phase relationship, irrespective of whether the radiation sources and the receivers are or are not phase-coupled. In that way it is possible to provide for interferometric detection of the electromagnetic signals, in which case interferometric algorithms are used for image production, such algorithms taking account of the phase differences in the electromagnetic signals between the individual receivers.

In addition in an embodiment the first and second receivers are phase-coupled to the radiation sources.

In an embodiment the electromagnetic signals emitted by the radiation sources are in a frequency range of between 800 MHz and 10 THz, preferably between 30 GHz and 1 THz and particularly preferably are about 100 GHz. At those frequencies, large differences occur in the reflection and transmission behaviour of various materials, which play a part for example in monitoring people. Metals, for example the surface of a firearm or stabbing weapon has a high reflectivity in that frequency range while biological material, for example the surface of the skin of the person bearing the weapon, has pronounced absorption windows in that frequency range.

The method according to the invention is suitable in that respect in particular for the emission of an electromagnetic continuous-wave signal (CW signal).

In an embodiment the frequency of the emitted electromagnetic continuous-wave signals can be kept constant over the measurement time. Alternatively the frequency of the signals can be altered over the measurement time, on the assumption that at no moment in time do two signals involve the same frequency in order to permit a unique association of the individual signals received by the receivers with the respective radiation sources over the entire measurement time.

In an embodiment emission of the first and second signals is also effected substantially simultaneously. By virtue of the unique frequency encoding of the electromagnetic signals emitted by the individual radiation sources, in spite of the simultaneous emission of the signals, they can be uniquely associated with the emitting radiation sources.

In a further embodiment the method according to the invention additionally has the following steps: arranging an object on the path of at least one electromagnetic signal between a radiation source and at least two receivers and calculating an image of the object from the signals received by the receivers.

In that case the object, for example a person to be monitored or an article to be checked, can be arranged between the radiation sources and the receivers in such a way that the signals emitted by the radiation sources are at least partially reflected by the object before they are received by the receivers. Such a mode of operation in reflection geometry has in particular the advantage that, in the personal monitoring security situation, the signals are not attenuated by the people themselves, that is to say the human bodies.

Alternatively or additionally the object can be arranged between the radiation sources and the receivers in such a way that the signals emitted by the radiation sources are propagated at least partially through the object before they are received by the receivers (transmission geometry).

Calculation of an image of the object from the signals received by the receivers is effected by means of algorithms as are typically used for imaging methods with a synthetic aperture or for interferometric radar imaging or interferometric radioastronomy.

In that respect in an embodiment the principles of synthetic imaging are used, which simultaneously processes signals, received by at least two receivers, of a single radiation source to afford a first synthetic image of a single virtual antenna with a large synthetic aperture. In that case that generation of a synthetic image is then also effected simultaneously for all signals emitted by the further radiation sources.

What is instructive for comprehension of the imaging principle of the method according to the invention and the corresponding apparatus is a comparison with the synthetic aperture radar referred to in the introductory part of this specification, with the radar system being mounted on an aircraft. In that sense the system according to the invention makes it possible for the object to be simultaneously irradiated from a plurality of positions along the direction of flight and/or for the radiation reflected by the object or transmitted through the object to be simultaneously received at a plurality of positions along the direction of flight. In that case the movement of the radar system with respect to the object is replaced by the spatially separate arrangement of at least two radiation sources and at least two receivers. At the same time however in an embodiment a relative movement can occur between the object and the radiation sources or receivers respectively.

Corresponding imaging algorithms are known for example from the book by Mehrdad Soumekh 'Fourier Array Imaging', Prentice Hall, PTR, edition: January 1994, ISBN-10: 0130637696, the content of which insofar as it concerns the imaging algorithms is incorporated in its entirety by reference thereto. The methods described herein as synthetic aperture imaging of producing an image of the object are also referred to at other items in the literature as holographic imaging or interference imaging.

In an embodiment of the invention the frequencies of the emitted electromagnetic signals are kept constant while in an alternative embodiment the frequencies of the electromagnetic signals are altered, in which case two signals are at the same frequency at no moment in time.

That makes it possible for example for the synthetic imaging method according to an embodiment of the present invention to be implemented in the manner of a frequency-modulated continuous-wave radar (FMCW radar). In that case the radiation sources emit electromagnetic signals at a constantly changing frequency. The frequency for example rises either linearly in order to drop abruptly again to the initial value at a given frequency (sawtooth pattern) or in another embodiment it rises and falls alternately at a constant speed of change. By virtue of the linear change in the frequency and the continuous transmission, it is possible to determine the speed of the object relative to the radiation source and also at the same time their absolute distance from each other.

In a further embodiment the change in the frequency of the emitted electromagnetic signals is effected in discrete steps. For improving image quality, it is already sufficient for the measurements to be performed for each radiation source with a small number of different frequencies. The measurement time required with a continuous change in frequency for the detection of frequencies between two singular discrete frequencies can be used for averaging the measurements at the singular frequencies, for the situation where measurement is effected only at those frequencies.

While the method according to the invention in a simple embodiment can be provided for incoherent reception of the electromagnetic signals, that is to say only for the detection of the amplitudes of the emitted electromagnetic signals, an alternative embodiment provides for reception of the signals with the receivers in coherent fashion so that the amplitude and the phase of the signals can be determined.

Such coherent detection of the signals is effected in an embodiment by coupling of the local oscillator signals used for reception to the electromagnetic signals emitted by the radiation sources.

In an embodiment of the invention emission of the first and second electromagnetic signals is effected by means of the following steps: producing a first transmitter intermediate frequency signal having a first transmitter intermediate frequency, and producing a second transmitter intermediate frequency signal having a transmitter intermediate frequency different from the first transmitter intermediate frequency. In that case the frequency spacing between the frequencies of the first and second transmitter intermediate frequency signals determines the frequency spacing of the electromagnetic signals emitted by the first and second radiation sources. In an embodiment in that respect the first transmitter intermediate frequency signal can be a 'vacuum signal' without frequency and power. In addition a radio frequency signal is produced, the frequency of which is preferably large in relation to transmitter intermediate frequencies and which then establishes the frequency range of the emitted electromagnetic signals. In this embodiment subsequently the first transmitter intermediate frequency signal is mixed with the radio frequency signal to afford a first sum and/or difference signal and the first sum and/or difference signal is emitted as the first electromagnetic signal by the first radiation source. In addition the second transmitter intermediate frequency signal is also mixed with the radio frequency signal to afford a second sum and/or difference signal and emitted as a second signal by the second radiation source.

In an embodiment the radio frequency signal is in a frequency range of between 800 MHz and 10 THz, preferably between 30 GHz and 1 THz and is particularly preferably about 100 GHz, that is to say in the frequency range of the electromagnetic signals to be emitted.

By virtue of the fact that the radio frequency signal is mixed with first and second transmitter intermediate frequency signals having different transmitter intermediate frequencies, the sum and/or difference signals emitted by the first and second radiation sources also involve different frequencies. In that case the frequency spacing of the first and second emitted signals is equal to the frequency spacing of the first and second intermediate frequency signals.

In a further embodiment of the method according to the invention reception of the first and second signals with a receiver includes the following steps: producing a radio frequency signal, and mixing the radio frequency signal with the first and second signal to afford a set of receiver intermediate frequency signals.

In an embodiment of the invention the electromagnetic signals emitted by the radiation sources are mixed in two receivers, preferably in all receivers, with the same radio frequency signal or with radio frequency signals which are coupled in locked-phase relationship.

If now the radio frequency signals for emission of the first and the second electromagnetic signals and the radio frequency signals for reception of the signals originate from the same generator, then the radio frequency signal used for reception, so-to-speak the local oscillator, and thus also the produced receiver intermediate frequency signals, are coupled in locked-phase relationship to the signals emitted by the transmitters. In that way coherent signal detection can easily be implemented.

The frequencies of the receiver intermediate frequency signals are equal to the frequencies of the first and second transmitter intermediate frequency signal. Thus all receiver intermediate frequency signals produced by a single receiver by mixing of the first and second signals emitted by the radiation sources, with the radio frequency signal, can be uniquely associated by way of their frequency with the respective radiation sources.

In a preferred embodiment the frequencies of the transmitter intermediate frequency signals and/or the receiver intermediate frequency signals are in a frequency range of between 100 kHz and 1 GHz, wherein the maximum frequency difference between the frequencies of the two transmitter intermediate frequency signals may not exceed the detection bandwidth of the receivers.

The aforementioned object is also attained by an apparatus for producing a synthetic image of an object, comprising at least a first and a second radiation source, wherein the first radiation source is adapted to emit a first electromagnetic signal having a first frequency, wherein the second radiation source is adapted to emit a second electromagnetic signal having a second frequency, wherein the first and second frequencies are different from each other, and comprising at least two receivers which are so adapted that each of them substantially simultaneously receives the first and second signals.

In that respect the apparatus according to the invention is not limited to two radiation sources and receivers respectively but in an embodiment has more than two, preferably in each case 64, radiation sources and/or receivers. In an embodiment they are so adapted that the emitted signals all involve mutually different frequencies.

In an embodiment the radiation sources are so adapted that the emitted electromagnetic signals are in a frequency range of between 800 MHz and 10 THz, preferably between 30 GHz and 1 THz and particularly preferably are about 200 GHz.

In that respect in an embodiment the radiation sources and the receivers are adapted to carry out the above-described method according to the invention.

In an embodiment the apparatus according to the invention has a radio frequency signal generator for a radio frequency signal.

In a further embodiment each radiation source has an intermediate frequency signal generator, a mixer and a transmitting antenna, wherein the intermediate frequency signal generator is adapted to produce an intermediate frequency signal having a transmitter intermediate frequency, wherein all transmitter intermediate frequencies are different from each other, wherein the mixer is so adapted that it forms a difference and/or sum signal from the radio frequency signal and the intermediate frequency signal and wherein the transmitting antenna is so adapted that it emits the difference and/or sum signal.

Each receiver in an embodiment of the invention has a receiving antenna and a mixer, wherein the receiving antenna is so adapted that it receives the signals emitted by the radiation sources and wherein the mixer is so adapted that it mixes the signals received by the receiving antenna with the radio frequency signal so that a set of receiver intermediate frequency signals is produced.

In an embodiment both the mixers of all radiation sources and also the mixers of all receivers are connected to the same radio frequency signal generator so that this provides an apparatus for coherent acquisition of the emitted signals.

In an embodiment the transmitting antenna and the receiving antenna of a pair of a radiation source and a receiver are formed by a single antenna with a directional coupler.

In an embodiment all radiation sources and receivers are arranged in one plane to permit good coverage of the k-space.

In that respect for example a desirable arrangement is one in which the radiation sources and the receivers are disposed in the form of a cross, a plus symbol or a rectangle (for example a square), wherein preferably the radiation sources lie on one or more first straight lines and the receivers lie on one or more second straight lines perpendicular to the first straight lines.

The method according to the invention and the corresponding apparatus are suitable in particular for use in apparatuses for material examination and for security checking on people, for example for detecting concealed explosives and weapons. For that purpose the apparatus according to the invention can be fitted for example in a security portal for an airport or a vehicle door.

Further advantages, features and possible uses of the present invention will be apparent from the description hereinafter of an embodiment and the associated FIGURE.

The embodiment diagrammatically shown in FIG. 1 of the apparatus according to the invention for producing a synthetic image has a total in each case of 64 transmitters or radiation sources 10 and receivers 11. In this respect the diagrammatic view only explicitly shows four radiation sources 10 and receivers 11 respectively while the similar continuation of the system with further radiation sources and receivers is indicated by black dots.

In the illustrated embodiment an object 8 is arranged between the radiation sources 10 and receivers 11 so that, depending on the respective position of the object 8 in relation to the radiation sources 10 and the receivers 11, the radiation transmitted through the object 8 or reflected by the object 8 is detected by the receivers 11.

The system has a computer 9 for control of the apparatus and for data acquisition or image production.

Each radiation source 10 has a signal generator 2 for generating a transmitter intermediate frequency signal 12 as well as a mixer 3 and a transmitting antenna 4. In addition each radiation source 10 is connected to a signal generator 1 for generating a radio frequency signal 13 having a frequency of 300 GHz. The mixers 3 of each radiation source 10 serve to mix the radio frequency signal 13 with a corresponding transmitter intermediate frequency signal 12. The mixed signal generated in that case is emitted from the radiation source 10 by means of the transmitting antenna 4.

In the illustrated embodiment the mixers 3 are so-called single sideband mixers which generate a signal which only contains the sum frequency of the frequency of the radio frequency signal 13 and the transmitter intermediate frequency signal 12. Each intermediate signal 12a, 12b, 12c, 12d, . . . produced by the signal generators 2 of the radiation sources 10 has a frequency different from the other intermediate frequencies. In the illustrated embodiment the first intermediate frequency 12a is 2 MHz, the second intermediate frequency 12b is 4 MHz, 12c is 6 MHz, the fourth intermediate frequency 12d is 8 MHz and so forth. As the mixers 3 of the radiation sources 10 respectively produce only the sum signal from the radio frequency signal 13 and the transmitter intermediate frequency signals 12 the electromagnetic signals which are emitted by the antennas 2 and which light the object 8 also involve the same frequency spacings as the transmitter intermediate frequency signals.

In an alternative embodiment (not shown) the single sideband mixers 3 respectively generate only the difference signal between the radio frequency signal 13 and the corresponding transmitter intermediate frequency signals 12. In that respect the only decisive consideration is that the mixers 3 do not produce two identical or overlapping frequencies and a unique association of the electromagnetic signals emitted by the radiation sources 10 with the individual radiation sources 10 is still guaranteed.

In a further embodiment (also not shown) two adjacent mixers 3 are supplied with the signal of a single intermediate frequency generator 2, wherein the first mixer 3 is a sideband mixer which only produces the difference frequency from the radio frequency signal 13 and the transmitter intermediate frequency signal while the second mixer 3 is a single sideband mixer which only produces the sum frequency from the radio frequency signal and the transmitter intermediate frequency signal. In a further embodiment the antenna 3 of a first radiation source 10 could also be fed directly with the radio frequency signal 13 while all other emitted signals are generated by mixing processes as in that case also unique associability of the signals with the radiation sources 10 is possible, by way of the frequency of the emitted electromagnetic signals.

The intermediate frequency signals 12 produced by the signal generators 2 are acquired by the computer 9 in order subsequently, upon detection, to permit an association of the individual received signals with the sources 10. For that purpose the signal outputs of the generators 2 are connected to the computer 9.

The receivers 11 also shown in FIG. 1 are of a structure similar to the radiation sources 10. Each of the receivers 11 comprises a receiving antenna 5 and a mixer 6. The mixers 6 of the receivers 11 are respectively connected to the corresponding receiving antennas 5 and to the signal generator 1. The mixers 6 of the receivers 11 are single sideband mixers which form intermediate frequency signals with the difference frequency between the radio frequency signal 13 and the signals received by the receiving antennas 5.

Each of the receivers 11 has a detection bandwidth corresponding to the maximum frequency spacing of two transmitter intermediate frequency signals of the generators 2. As each of the receiving antennas 5 receives all signals emitted by the radiation sources 10 and those signals are mixed by the mixers 6 with the radio frequency signal 13 the receiver intermediate frequency signals 7a, 7b, 7c, 7d, . . . of all receivers 11 contain signal components at all frequencies of the transmitter intermediate frequency signals 12a, 12b, 12c, 12d, . . . insofar as they were transmitted through or reflected by the object 8 and have reached the corresponding receiving antenna 5. Each signal output 7a, 7b, 7c, 7d, . . . thus contains a set of intermediate frequency signals which can be uniquely associated with one of the radiation sources 10.

The receiver intermediate frequency signals 7a, 7b, 7c, 7d, . . . are connected to the computer 9. For each receiver 11 the computer 9 has a corresponding demultiplexer which makes it possible to decompose each set of receiver intermediate signals, as it is received from the respective receiver 11, into its spectral frequency constituents, and to evaluate same.

By means of the known algorithms for computing an image which was obtained with a synthetic aperture, a corresponding image of the object 8 is computed in the computer 9 from the receiver intermediate frequency signals 7a, 7b, 7c, 7d, . . . and stored or represented to the user of the system on a display screen.

In that respect images of the object 8 are simultaneously detected with all receivers 11 from all illumination directions which are defined by the positions of the radiation sources 10.

For the purposes of the original disclosure it is pointed out that all features as can be seen by a man skilled in the art from the present description, the drawing and the claims, even if they are described in specific terms only in connection with certain other features, can be combined both individually and also in any combinations with others of the features or groups of features disclosed herein insofar as that has not been expressly excluded or technical aspects make such combinations impossible or meaningless. A comprehensive explicit representation of all conceivable combinations of features is dispensed with here only for the sake of brevity and readability of the description. While the invention has been described and illustrated in detail in the drawings and the preceding description that representation and description are only by way of example and are not to be considered as a limitation on the scope of protection as defined by the claims. The invention is also not restricted to the disclosed embodiments.

Modifications to the disclosed embodiments are apparent to the man skilled in the art from the drawing, the description and the accompanying claims. In the claims the word 'have' does not exclude other elements or steps and the indefinite article 'a' does not exclude a plurality. The presence of more than two radiation sources and receivers is also not excluded by the numeral 'two' in the claims. The mere fact that given features are claimed in different claims does not exclude the combination thereof. Reference numerals in the claims are not intended as a limitation on the scope of protection.

LIST OF REFERENCES 1 signal generator for the radio frequency signal 13
2 signal generator for an intermediate frequency signal 12
3 mixer
4 transmitting antenna
5 receiving antenna
6 mixer
7 receiver intermediate frequency signals
8 object
9 computer
10 radiation source
11 receiver
12a first intermediate frequency signal
12b second intermediate frequency signal
12c third intermediate frequency signal
12d fourth intermediate frequency signal
13 radio frequency signal

What is claimed is:

1. A method of synthetic imaging comprising the steps of:
emitting a first electromagnetic signal having a first frequency from a first radiation source having a first transmitting antenna;
emitting at least one second electromagnetic signal having a second frequency from a second radiation source having a second transmitting antenna,
wherein the first frequency and second frequency are different, and the first transmitting antenna and the second transmitting antenna are different;
substantially simultaneously receiving the first signal and the second signal with a first receiver having a first receiving antenna;
substantially simultaneously receiving the first signal and the second signal with at least one second receiver having a second receiving antenna,
wherein the first receiving antenna and the second receiving antenna are different;
arranging an object on a path of at least one electromagnetic signal between the radiation sources and the receivers,
wherein the receiving of at least one of the first signal or the second signal with at least one of the first receiver or the second receiver includes the following steps:
producing a single radio frequency signal,
mixing the radio frequency signal in the first receiver with the first signal and the second signal, thereby generating a first set of receiver intermediate frequency signals, and
mixing the radio frequency signal in the second receiver with the first signal and the second signal, thereby generating a second set of receiver intermediate frequency signals,
communicating the first set of receiver intermediate frequency signals and the second set of receiver intermediate frequency signals to a computer,
decomposing the first set of receiver intermediate frequency signals into first spectral frequency constituents with a first demultiplexer corresponding to the first receiver, and
decomposing the second set of receiver intermediate frequency signals into second spectral frequency constituents with a second demultiplexer corresponding to the second receiver; and
computing imaging data for the object from the first set of receiver intermediate frequency signals and the second set of receiver intermediate frequency signals received by the first receiver and the second receiver by way of a synthetic aperture algorithm.

2. The method as set forth in claim 1, wherein the emitting of the first signal and the second signal is effected substantially simultaneously.

3. The method as set forth in claim 1, wherein the first receiver and second receiver are phase-coupled to each other.

4. The method as set forth in claim 1, wherein the first radiation source and the second radiation source and the first receiver and the second receiver are phase-coupled to each other.

5. The method as set forth in claim 1, wherein the first signal and the second signal are coherently received by the receivers and at least one of the amplitude or the phase of the first signal and the second signal is determined.

6. The method as set forth in claim 1, wherein the first frequency and the second frequency of the emitted first electromagnetic signal and the second electromagnetic signal, respectively, are kept constant.

7. The method as set forth in claim 1, wherein the first frequency and the second frequency of the first electromagnetic signal and the second electromagnetic signal, respectively, are altered so that at no moment in time do the first electromagnetic signal and the second electromagnetic signal have the same frequency.

8. The method as set forth in claim 1, wherein the emitting of the first electromagnetic signal and the second electromagnetic signal includes the following steps:
producing a first transmitter intermediate frequency signal having a first transmitter intermediate frequency;
producing a second transmitter intermediate frequency signal having a second transmitter intermediate frequency different from the first transmitter intermediate frequency,
producing a radio frequency signal;
mixing the first transmitter intermediate frequency signal with the radio frequency signal, thereby generating at least one of a first sum signal or a first difference signal, and emitting at least one of the first sum signal or the first difference signal as the first electromagnetic signal from the first radiation source, and
mixing the second transmitter intermediate frequency signal with the radio frequency signal, thereby generating at least one of a second sum signal or a second difference signal, and emitting at least one of the first sum signal the first difference signal as the second electromagnetic signal from the second radiation source.

9. An apparatus for synthetic imaging of an object comprising:
　at least a first and a second radiation source,
　wherein the first radiation source includes a first transmitting antenna and is adapted to emit a first electromagnetic signal having a first frequency,
　wherein the second radiation source includes a second transmitting antenna and is adapted to emit a second electromagnetic signal having a second frequency, and
　wherein the first frequency and second frequency are different and the first transmitting antenna and the second transmitting antenna are different,
　at least a first receiver and a second receiver having a first receiving antenna and a second receiving antenna, respectively,
　wherein the first receiving antenna and the second receiving antenna are different,
　wherein the first receiver and the second receiver are so adapted that each of them substantially simultaneously receives the first signal and the second signal,
　wherein the first receiver is adapted to:
　　mix a single radio frequency signal in the first receiver with the first signal and the second signal, thereby generating a first set of receiver intermediate frequency signals, and
　　communicate the first set of receiver intermediate frequency signals to a computer,
　wherein the second receiver is adapted to:
　　mix the radio frequency signal in the second receiver with the first signal and the second signal, thereby generating a second set of receiver intermediate frequency signals,
　　communicate the second set of receiver intermediate frequency signals to the computer,
　wherein an object is arranged between the first radiation source and the second radiation source and the first receiver and the second receiver; and,
　the computer adapted to:
　　decompose the first set of receiver intermediate frequency signals into first spectral frequency constituents with a first demultiplexer corresponding to the first receiver, and
　　decompose the second set of receiver intermediate frequency signals into second spectral frequency constituents with a second demultiplexer corresponding to the second receiver, and
　　compute imaging data for the object from the first set of receiver intermediate frequency signals and the second set of receiver intermediate frequency signals received by the first receiver and the second receiver by way of a synthetic aperture algorithm.

10. The apparatus as set forth in claim 9, wherein the first receiver and the second receiver are coupled together in locked-phase relationship.

11. The apparatus as set forth in claim 9, wherein the first radiation source and the second radiation source are adapted to substantially simultaneously emit the first signal and the second signal.

12. The apparatus as set forth in claim 9, further comprising a radio frequency signal generator adapted to produce the radio frequency signal.

13. The apparatus as set forth in claim 9, wherein the first radiation source includes a first intermediate frequency signal generator and a first mixer, and the second radiation source includes a second intermediate frequency signal generator and a second mixer,
　wherein the first intermediate frequency signal generator is adapted to generate a first transmitter intermediate frequency signal having a first transmitter intermediate frequency, and the second intermediate frequency signal generator is adapted to generate a second transmitter intermediate frequency signal having a second transmitter intermediate frequency,
　wherein the first transmitter intermediate frequency and the second transmitter intermediate frequency are different,
　wherein the first mixer is adapted to generate at least one of a first difference signal or a first sum signal from the radio frequency signal and the first transmitter intermediate frequency signal, and the second mixer is adapted to generate at least one of a second difference signal or a second sum signal from the radio frequency signal and the second transmitter intermediate frequency signal, and
　wherein the first transmitting antenna is adapted to emit at least one of the first difference signal or the first sum signal, and the second transmitting antenna is adapted to emit at least one of the second difference signal or the second sum signal.

14. The apparatus as set forth in claim 9, wherein at least one of (i) the first radiation source and the second radiation source or (ii) the first receiver and the second receiver are coupled to a single radio frequency signal generator.

15. The apparatus as set forth in claim 9, further comprising a processor adapted to generate, from a set of receiver intermediate frequency signals, an image of the object arranged between the first radiation source and the second radiation source and the first receiver and the second receiver.

16. The apparatus as set forth in claim 9, wherein the first radiation source and the second radiation source and the first receiver and the second receiver are so arranged that the first emitted signal and the second emitted signal pass on to the first receiver and the second receiver by way of reflection at the object.

17. A method for examination of people with the apparatus for synthetic imaging as set forth in claim 9.

* * * * *